US008332813B2

(12) United States Patent
Arsanjani et al.

(10) Patent No.: US 8,332,813 B2
(45) Date of Patent: *Dec. 11, 2012

(54) SERVICE RE-FACTORING METHOD AND SYSTEM

(75) Inventors: Ali P. Arsanjani, Fairfield, IA (US); Ahamed Jalaldeen, Karnataka (IN); Siddharth Purohit, Allen, TX (US)

(73) Assignee: International Business Machines Corporation, Armonk, NY (US)

(*) Notice: Subject to any disclaimer, the term of this patent is extended or adjusted under 35 U.S.C. 154(b) by 1028 days.

This patent is subject to a terminal disclaimer.

(21) Appl. No.: 12/332,504

(22) Filed: Dec. 11, 2008

(65) Prior Publication Data

US 2010/0153914 A1    Jun. 17, 2010

(51) Int. Cl.
    *G06F 9/44* (2006.01)
(52) U.S. Cl. ............ 717/110; 717/116; 717/117
(58) Field of Classification Search .......... 717/110–123; 709/201–203, 219–250; 726/10, 21
See application file for complete search history.

(56) References Cited

U.S. PATENT DOCUMENTS

| 6,779,172 | B1 * | 8/2004 | Weerawarana et al. ....... 717/115 |
| 6,804,682 | B1 * | 10/2004 | Kemper et al. ................... 1/1 |
| 6,865,593 | B1 * | 3/2005 | Reshef et al. ................ 709/203 |
| 7,370,318 | B1 * | 5/2008 | Howe et al. ................... 717/110 |
| 7,373,596 | B2 | 5/2008 | Hu et al. |
| 8,224,869 | B2 | 7/2012 | Jalaldeen |
| 2002/0104068 | A1 | 8/2002 | Barrett et al. |
| 2004/0093381 | A1 | 5/2004 | Hodges et al. |
| 2004/0249645 | A1 | 12/2004 | Hauser et al. |
| 2005/0108684 | A1 | 5/2005 | Sohn et al. |
| 2005/0137836 | A1 | 6/2005 | Clark et al. |
| 2005/0144226 | A1 * | 6/2005 | Purewal ........................ 709/203 |
| 2005/0262188 | A1 | 11/2005 | Mamou et al. |

(Continued)

FOREIGN PATENT DOCUMENTS

WO    WO2005048066 A2    5/2005

OTHER PUBLICATIONS

Kavianpour; SAO and Large Scale and Complex Enterprise Transformation; ICSOC 2007, LNCS 4749, pp. 530-545, © Springer-Verlag Berlin Heidelberg 2007.*

(Continued)

*Primary Examiner* — Wei Zhen
*Assistant Examiner* — Satish Rampuria
(74) *Attorney, Agent, or Firm* — Schmeiser, Olsen & Watts; John Pivnichny

(57) ABSTRACT

A service re-factoring method and system. The method includes selecting by a computing system, a first service comprising a first name. The computing system receives a second name for a second service to be generated from the first service. The computing system executes a service refactoring software application, adjusts a granularity of the first service, and generates the second service. The computing system retrieves first traceability links associated with the first service and a first value associated with a first service identification technique. The first traceability links are created within the second service. The computing system generates a second value associated with a second service identification technique. The first service, the first name, and the first value are removed from the computing system. The computing system stores the second service, the second name, the second value, and the first traceability link.

20 Claims, 13 Drawing Sheets

U.S. PATENT DOCUMENTS

| | | | |
|---|---|---|---|
| 2006/0026506 A1 | 2/2006 | Kristiansen et al. |
| 2006/0069717 A1 | 3/2006 | Mamou et al. |
| 2006/0156277 A1 | 7/2006 | Gupta et al. |
| 2006/0167665 A1 | 7/2006 | Ata |
| 2006/0242195 A1 | 10/2006 | Bove et al. |
| 2007/0203740 A1 | 8/2007 | Abu El Ata et al. |
| 2007/0204007 A1 | 8/2007 | Ashaari et al. |
| 2008/0004927 A1 | 1/2008 | Haller et al. |
| 2008/0021753 A1 | 1/2008 | Cummins |
| 2008/0022257 A1 | 1/2008 | Baartman et al. |
| 2008/0028084 A1 | 1/2008 | Bloching et al. |
| 2008/0028365 A1 | 1/2008 | Erl |
| 2008/0052664 A1 | 2/2008 | Batabyal |
| 2008/0065466 A1 | 3/2008 | Liu et al. |
| 2008/0091513 A1 | 4/2008 | Waggoner |
| 2008/0127047 A1 | 5/2008 | Zhang et al. |
| 2008/0155397 A1 | 6/2008 | Bissonnette et al. |
| 2008/0172574 A1 | 7/2008 | Fisher |
| 2008/0177887 A1 | 7/2008 | Theilmann |
| 2008/0183850 A1 | 7/2008 | Basu et al. |
| 2008/0282219 A1 | 11/2008 | Seetharaman et al. |
| 2009/0024561 A1 | 1/2009 | Palanisamy |
| 2009/0049025 A1 | 2/2009 | Fay et al. |
| 2009/0049040 A1 | 2/2009 | Fay et al. |
| 2009/0064205 A1 | 3/2009 | Fay et al. |
| 2009/0112668 A1 | 4/2009 | Abu El Ata |
| 2009/0182750 A1 | 7/2009 | Keyes et al. |
| 2010/0017783 A1 | 1/2010 | Brininstool et al. |
| 2010/0030890 A1 | 2/2010 | Dutta et al. |
| 2010/0037201 A1 | 2/2010 | Salle et al. |
| 2010/0146479 A1 | 6/2010 | Arsanjani et al. |
| 2010/0153464 A1 | 6/2010 | Jalaldeen |
| 2012/0203743 A1 | 8/2012 | Jalaldeen |

OTHER PUBLICATIONS

Penta et al.; Evolution Doctor: a Framework to Control Software System Evolution; Proceedings of the Ninth European Conference on Software Maintenance and Reengineering (CSMR'05); © 2005 IEEE; pp. 1-4.*

Zhang et al.; Refactoring Middleware with Aspects; 2003 IEEE; pp. 1058-1073.*

Amendment filed Sep. 21, 2011 in response to Office Action (Mail Date Jul. 11, 2011) for U.S. Appl. No. 12/335,686, filed Dec. 16, 2008; Confirmation No. 1560.

Office Action (Mail Date Feb. 13, 2012) for U.S. Appl. No. 12/328,827, filed Dec. 5, 2008; Confirmation No. 7663.

Notice of Allowance (Mail Date Mar. 9, 2012) for U.S. Appl. No. 12/335,686, filed Dec. 16, 2008; Confirmation No. 1560.

U.S. Appl. No. 13/448,893, filed Apr. 17, 2012; Confirmation No. 8698.

Amendment filed May 9, 2012 in response to Office Action (Mail Date Feb. 13, 2012) for U.S. Appl. No. 12/328,827, filed Dec. 5, 2008; Confirmation No. 7663.

Final Office Action (Mail Date May 16, 2012) for U.S. Appl. No. 12/328,827, filed Dec. 5, 2008; Confirmation No. 7663.

Portier; SOA Terminology Overview, Part 1: Service, Architecture, Governance, and Business Terms; IBM Developer Works (Nov. 15, 2006); retrieved from http://www.ibm.com/developerworks/webservices/library/ws-soa-term1/ on May 12, 2012; 13 pages.

ROA; Using UML Service Components to Represent the SOA Architecture Pattern; IBM Developer Works (Jun. 19, 2007); retrieved from http://www.ibm.com/developerworks/architecture/libraiy/ar-logsoa/ on May 12, 2012; 11 pages.

Falleri et al.; Towards a Traceability Framework for Model Fransformations in Kermeta; 10 pages; in ECMDA-TW'06: ECMDA Traceability Workshop, Sintef ICT, Norway; (2006); pp. 31-40.

Vanhooff et al.; Traceability as Input for Model Transformations; 10 pages; European conference on model driven architecture foundations and applications ECMDA 2007 (2007); pp. 37-46.

VanBaelen et al.; Traceability Management Toolset; ITEA—Information Technology for European Advancement; Martes Model-Based Approach for Real-Time Embedded Systems Development; Sep. 20, 2007; 28 pages.

Office Action (Mail Date Jul. 11, 2011) for U.S. Appl. No. 12/335,686, filed Dec. 16, 2008; Confirmation No. 1560.

Falleri et al.; Towards a traceability framework for model transformations in Kermeta; 10 pages.

Vanhooff et al.; Traceability as Input for Model Transformations; 10 pages.

VanBaelen et al.; ITEA—Information Technology for European Advancement; Martes Model-Based Approach for Real-Time Embedded Systems Development; Tradeability Management Toolset; 28 pages.

* cited by examiner

○ TooGrained To FineGrained

Parameters
Specify values for parameters.

Parameter values:

| Parameter Name | Type | Multiplicity | Value |
|---|---|---|---|
| TooGrainedService | Interface | 1..* | |
| FineGrainedService | Literal String | 1 | |

[Add Value] [Delete Value]

[<Back] [Next>] [Finish] [Cancel]

CoarseGrained To FineGrained

Parameters
Specify values for parameters.

Parameter values:

| Name | Type | Multiplicity | Value |
|---|---|---|---|
| CoarseGrainedService | Class | 1 | |
| FineGrainedService | Literal String | 1..* | |

[Add Value] [Delete Value]

[<Back] [Next>] [Finish] [Cancel]

*FIG. 11*

TooGrained To FineGrained

Parameters
Specify values for parameters.

Parameter values:

| Parameter Name | Type | Multiplicity | Value |
|---|---|---|---|
| TooGrainedService | Class | 1..* | |
| FineGrainedService | Literal String | 1 | |

[Add Value] [Delete Value]

[<Back] [Next>] [Finish] [Cancel]

SERVICE RE-FACTORING METHOD AND SYSTEM

FIELD OF THE INVENTION

The present invention relates to a method and associated system for re-factoring services.

BACKGROUND OF THE INVENTION

Modifying various components of a software system typically comprises an inefficient process with little flexibility. Accordingly, there exists a need in the art to overcome at least some of the deficiencies and limitations described herein above.

SUMMARY OF THE INVENTION

The present invention provides a method comprising:

selecting, by a computing system from a service portfolio associated with a service oriented architecture (SOA) project in response to a command from a user, a first service comprising a first name for said first service;

receiving, by said computing system from said user, a second name for a second service to be generated from said first service;

executing, by said computing system, a service refactoring software application;

adjusting, by said computing system in response to said executing, a granularity of said first service;

generating, by said computing system as a result of said adjusting, said second service;

associating, by said computing system, said second service with said second name;

retrieving, by said computing system, first traceability links associated with said first service;

retrieving, by said computing system, a first value associated with a first service identification technique associated with identifying said first service;

creating, by said computing system, said first traceability links within said second service;

generating, by said computing system, a second value associated with a second service identification technique associated with identifying said second service;

removing, by said computing system, said first service, said first name, and said first value; and storing, by said computing system, said second service, said second name, said second value, and said first traceability link.

The present invention provides a computing system a processor coupled to a computer-readable memory unit, said memory unit comprising instructions that when executed by the processor implements a service re-factoring method, said method comprising:

selecting, by said computing system from a service portfolio associated with a service oriented architecture (SOA) project in response to a command from a user, a first service comprising a first name for said first service;

receiving, by said computing system from said user, a second name for a second service to be generated from said first service;

executing, by said computing system, a service refactoring software application;

adjusting, by said computing system in response to said executing, a granularity of said first service;

generating, by said computing system as a result of said adjusting, said second service;

associating, by said computing system, said second service with said second name;

retrieving, by said computing system, first traceability links associated with said first service;

retrieving, by said computing system, a first value associated with a first service identification technique associated with identifying said first service;

creating, by said computing system, said first traceability links within said second service;

generating, by said computing system, a second value associated with a second service identification technique associated with identifying said second service;

removing, by said computing system, said first service, said first name, and said first value; and storing, by said computing system, said second service, said second name, said second value, and said first traceability link.

The present invention advantageously provides a simple method and associated system capable of modifying various software components of a system.

BRIEF DESCRIPTION OF THE DRAWINGS

FIG. 9 illustrates a first user interface, in accordance with embodiments of the present invention.

FIG. 10 illustrates a second user interface, in accordance with embodiments of the present invention.

FIG. 11 illustrates a third user interface, in accordance with embodiments of the present invention.

FIG. 12 illustrates a fourth user interface, in accordance with embodiments of the present invention.

DETAILED DESCRIPTION OF THE INVENTION

Figure 1:
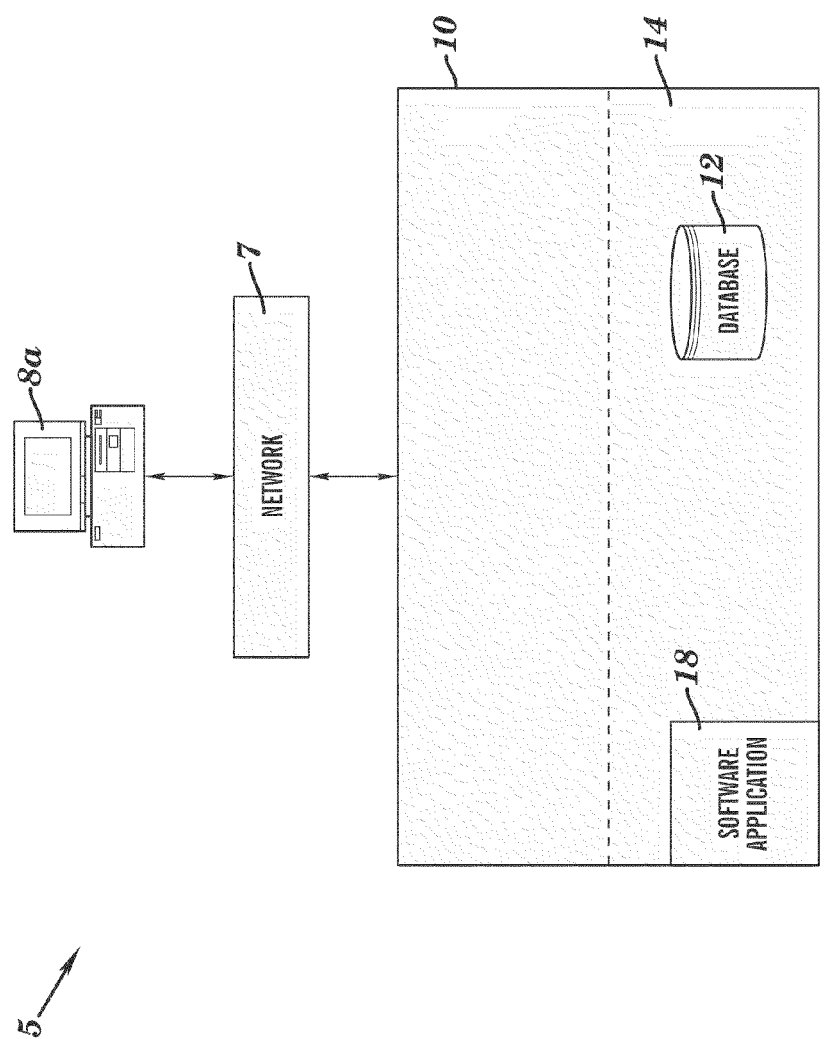
FIG. 1 illustrates a system for re-factoring services in a service oriented architecture (SOA) project, in accordance with embodiments of the present invention.

FIG. 1 illustrates a system 5 for re-factoring services in a service oriented architecture (SOA) project, in accordance with embodiments of the present invention. SOA comprises enterprise scale IT architecture for providing IT agility to support business agility. A service is defined herein as:

1. Business perspective: A well defined, encapsulated, reusable, business-aligned capability. A service is fully defined via a service description.
2. IT Perspective: A discoverable and invokable software resource having a service description/interface and configurable using policies.

Re-factoring services comprises a process for adjusting a granularity of services as described, infra. System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., entering data) computing system 10. Computing system 10 may comprise any type of computing system(s) including, inter alia, a personal computer (PC), a server computer, a database computer, etc. Computing system 10 is used to retrieve data from computing apparatus 8a for generating an architectural view of SOA solutions. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8a such as, inter alia, services, names associated with services, traceability links, characteristics associated with the services, etc) and any generated data (e.g., service models, configuration files, SOA solution architecture models, refactored services, etc).

Software application 18 performs the following functions associated with an automated process for adjusting a granularity of a service or services:

1. Software application 18 selects (i.e., from a service portfolio associated with an SOA project in response to a command from a user) a first service comprising a first name. A service portfolio comprises a collection of services in a SOA solution.
2. Software application 18 receives (from the user) a second name for a second service to be generated from the first service;
3. Software application 18 executes a service refactoring module.
4. Software application 18 adjusts (i.e., in response to executing the service refactoring module) a granularity of the first service.
5. Software application 18 generates the second service as a result of adjusting the granularity of the first service.
6. Software application 18 associates the second service with the second name.
7. Software application 18 retrieves first traceability links associated with the first service. Traceability links provide relationships between model elements.
8. Software application 18 retrieves a first value associated with a first service identification technique associated with identifying the first service.
9. Software application 18 creates the first traceability links within the second service.
10. Software application 18 generates a second value associated with a second service identification technique associated with identifying the second service.
11. Software application 18 removes (i.e., from a computing system) the first service, the first name, and the first value.
12. Software application 18 stores (i.e., in the computing system) the second service, the second name, the second value, and the first traceability link.

Software application 18 adjusts a granularity of the first service (i.e., as described in step 4, supra) in accordance with the following scenarios:

1. Re-factoring a coarse-grained candidate service into multiple fine-grained candidate services. A coarse grained candidate service is defined herein as a service providing a large scope of functionality. A fine grained candidate service is defined herein as a service providing an appropriate scope of functionality. In this scenario, the first service comprises a coarse-grained candidate service and the second service comprises fine-grained candidate services.
2. Re-factoring multiple too-grained candidate services into a single fine-grained candidate service. Too grained candidate services are defined herein as services providing a very small scope of functionality. In this scenario, the first service comprises too-grained candidate services and the second service comprises a fine-grained candidate service.
3. Re-factoring a coarse-grained exposed service into multiple fine-grained exposed services. An exposed service is defined herein as a service qualified for exposure. In this scenario, the first service comprises a coarse-grained exposed service and the second service comprises fine-grained exposed services. Additionally in this scenario, software application 18 retrieves characteristics associated with the first service. The characteristics may comprise, inter alia, service operations, parameters of service operations, service messages, service dependencies, service compositions, service non-functional requirements, associated business rules, realizing service components, and associated use cases of the first service. A service operation is an elementary part of a service and specifies associated inputs, purpose (function, duty or obligations) outputs (artifacts, products, outcomes or deliverables). A service message is an abstract, typed definition of data being communicated during service operation invocations. Service dependencies describe relationships between services that arise in a larger context of how they will be used. A service composition comprises an aggregate of services collectively composed to automate a particular task or business process. A service component is a realization of services. Service non-functional requirements comprise requirements which specify criteria that may be used to judge the operation of services rather than specific behaviors. Business rules describe operations, definitions, and constraints that apply to an organization in achieving its goals. A use case comprises a description of a system's behavior as it responds to a request that originates from outside of that system. The aforementioned characteristics are created in the second service.
4. Re-factoring multiple too-grained exposed services into a single fine-grained exposed service. In this scenario, the first service comprises too-grained exposed services and the second service comprises a fine-grained exposed service. Additionally in this scenario, software application 18 retrieves characteristics associated with the first service. The characteristics may comprise, inter alia, service operations, parameters of service operations, service messages, service dependencies, service compositions, service non-functional requirements, associated business rules, realizing service components, and associated use cases of the first service.

The following examples illustrate implementation scenarios for adjusting a granularity of the first service:

EXAMPLE 1

Figure 9:
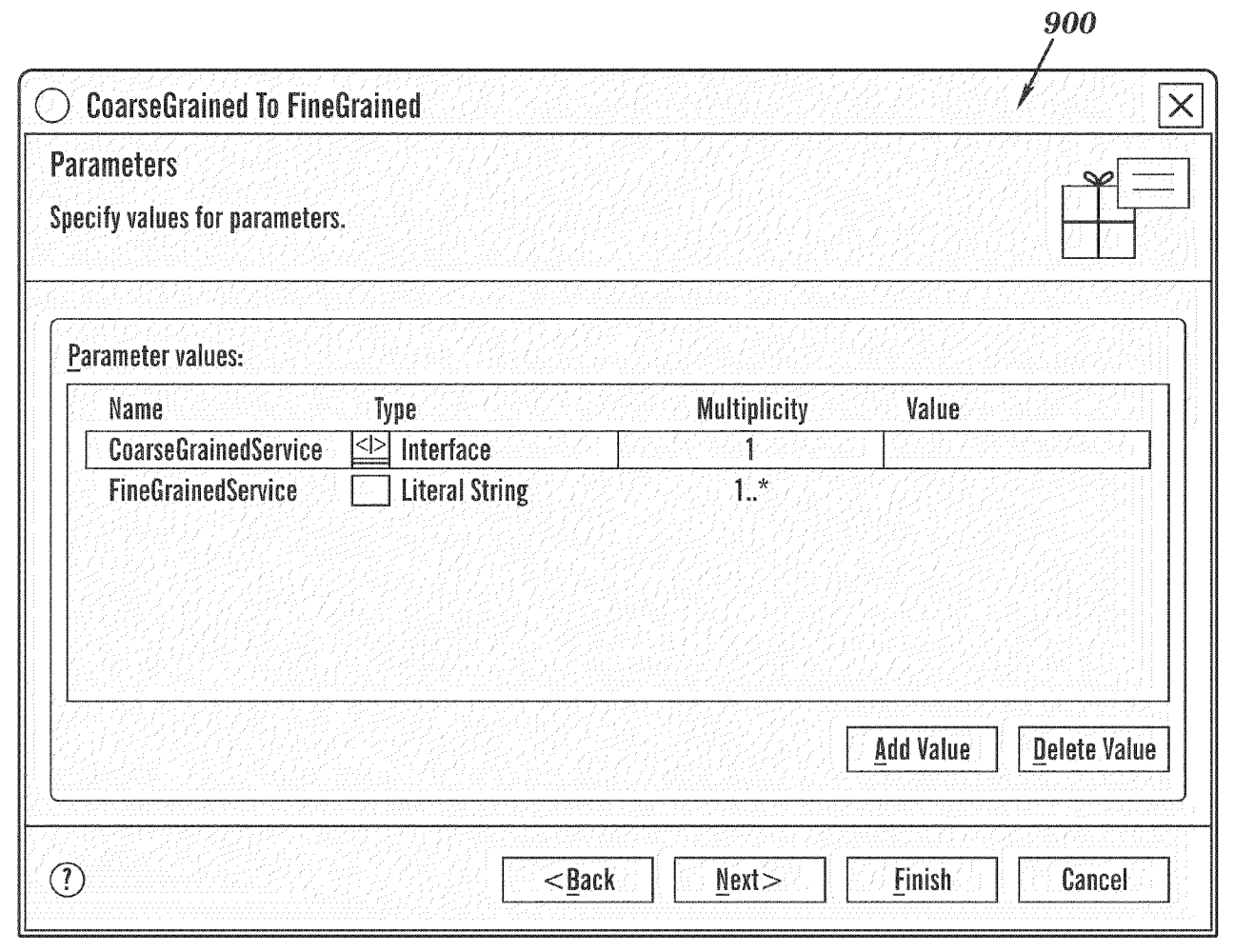

1. An SOA architect identifies a transfer fund service as a coarse-grained candidate service that needs to be re-factored in a UML based SOA modeling tool.
2. The SOA Architect selects the coarse-grained candidate service from a service portfolio through a user interface (e.g., as illustrated in FIG. 9, supra).
3. The SOA architect enters the names of multiple fine-grained candidate services (e.g., a debit source account, a credit target account, etc) through the user interface.
4. The SOA architect invokes service re-factoring activities.
5. A computing system (e.g., computing system 10 of FIG. 1) retrieves a traceability link to the transfer fund process and retrieves process decomposition as a service identification technique value.
6. The computing system creates a debit source account as a new fine-grained candidate service.
7. The computing system creates traceability link from the debit source account candidate service to the transfer fund process and retrieves process decomposition as a service identification technique value.
8. The computing system creates a credit target account as a new fine-grained candidate service.
9. The computing system creates a traceability link from a credit target account candidate service to a transfer fund process and retrieves process decomposition as a service identification technique value.
10. The computing system removes the transfer fund coarse-grained candidate service.

EXAMPLE 2

1. An SOA architect identifies create a customer service and an update customer service as too-grained candidate services that are require to be re-factored in a UML based SOA modeling tool.
2. The SOA architect selects the too-grained candidate services from a service portfolio through a user interface (e.g., as illustrated in FIG. 10, supra).
3. The SOA architect enters a name for a fine-grained candidate service (i.e., manage customer) through the user interface.
4. The SOA architect invokes service re-factoring activities.
5. A computing system (e.g., computing system 10 of FIG. 1) creates manage customer as a new fine-grained candidate service.
6. The computing system retrieves traceability links to a customer entity from create customer and update customer too-grained candidate services and retrieves information analysis as service identification technique value.
7. The computing system creates a traceability link from the manage customer candidate service to the customer entity
8. The computing system removes the create customer and update customer too-grained candidate services.

EXAMPLE 3

1. An SOA architect identifies a transfer fund service as a coarse-grained exposed service that is required to be re-factored in a UML based SOA modeling tool.
2. The SOA architect selects the coarse-grained exposed service from a service portfolio through a user interface (e.g., as illustrated in FIG. 11, supra).
3. The SOA architect enters names of multiple fine-grained exposed services (e.g., debit source account, credit target account, etc) through the user interface.
4. The SOA architect invokes service re-factoring activities.
5. A computing system (e.g., computing system 10 of FIG. 1) retrieves a traceability link to the transfer fund candidate service and characteristics of the transfer fund candidate service (e.g., service operations, parameters of service operations, service messages, service dependencies, service compositions, service non-functional requirements, associated business rules, realizing service components, and associated use cases of transfer fund coarse-grained exposed service).
6. The computing system creates a traceability link to the transfer fund candidate service and characteristics of the transfer fund candidate service (e.g., service operations, parameters of service operations, service messages, service dependencies, service compositions, service non-functional requirements, associated business rules, realizing service components and associated use cases on the debit source account fine-grained exposed service).
7. The computing system creates a traceability link from the debit source account exposed service to the transfer fund candidate service.
8. The computing system creates a credit target account as a new fine-grained exposed service.
9. The computing system creates a traceability link to the transfer fund candidate service and characteristics of the transfer fund candidate service (e.g., service operations, parameters of service operations, service messages, service dependencies, service compositions, service non-functional requirements, associated business rules, realizing service components and associated use cases on the credit target account fine-grained exposed service).
10. The computing system removes the transfer fund coarse-grained exposed service.

EXAMPLE 4

1. An SOA architect identifies a create customer service and an update customer service as too-grained exposed services that are required to be re-factored in UML based SOA modeling tool.
2. The SOA architect selects the too-grained exposed services from a service portfolio through a user interface (e.g., as illustrated in FIG. 12, supra).
3. The SOA architect enters a name for a fine-grained exposed service (e.g., manage customer) through the user interface.
4. The SOA architect invokes service re-factoring activities.
5. A computing system (e.g., computing system 10 of FIG. 1) creates manage customer as a new fine-grained exposed service.
6. The computing system retrieves traceability links to create customer and update customer candidate services and characteristics of the create customer and update customer candidate services (e.g., service operations, parameters of service operations, service messages, service dependencies, service compositions, service non-functional requirements, associated business rules, realizing service components, and associated use cases of the chosen too-grained exposed service).
7. The computing system creates a traceability link to the candidate service and characteristics for the candidate service (e.g., service operations, parameters of service operations, service messages, service dependencies, service compositions, service non-functional requirements, associated business rules, realizing service components and associated use cases on the manage customer fine-grained exposed service).

8. The computing system removes the create customer and update customer too-grained exposed services.

Figure 2:
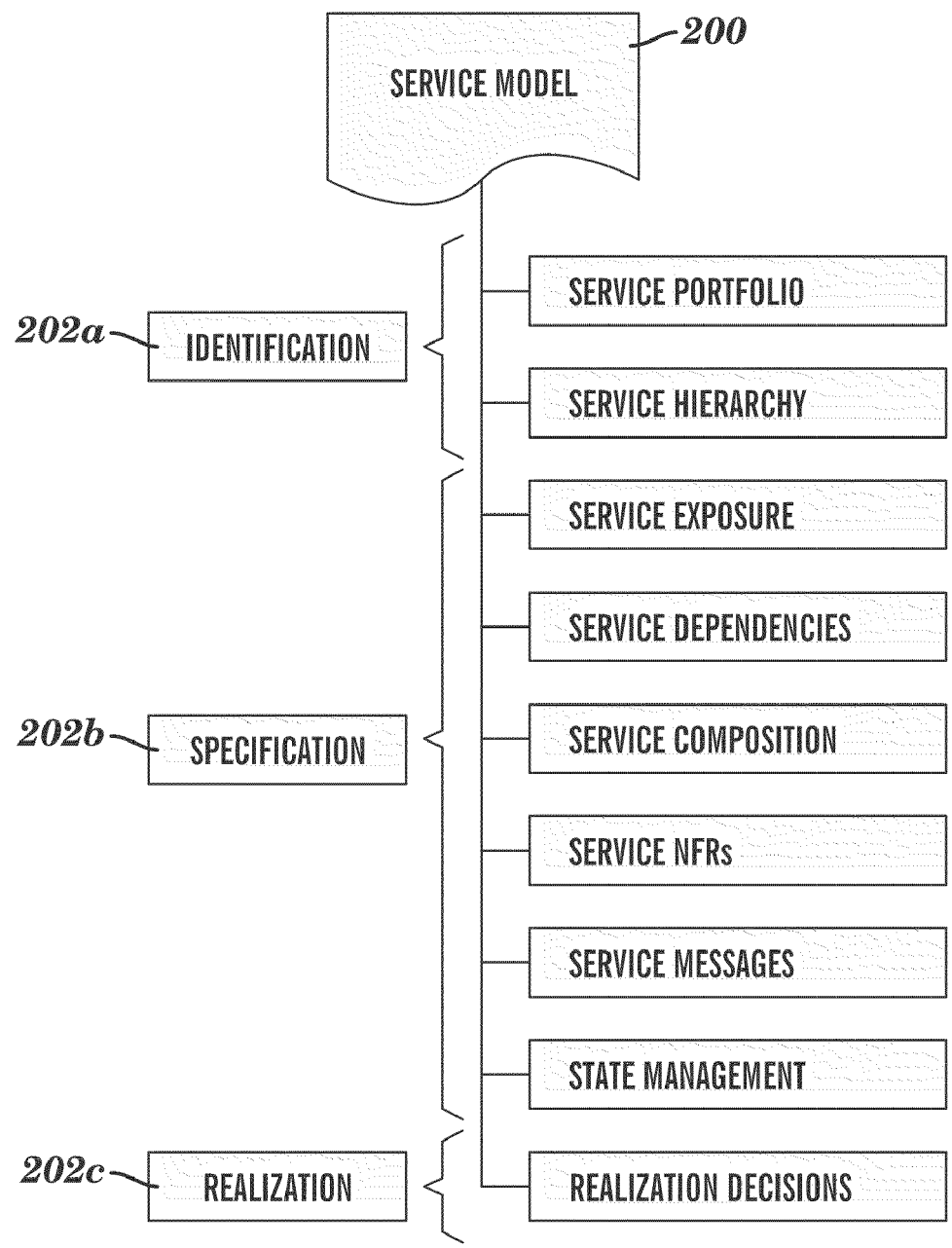
FIG. 2 illustrates a service model, in accordance with embodiments of the present invention.

FIG. 2 illustrates a service model 200, in accordance with embodiments of the present invention. Service model 200 in FIG. 2 comprises a graphical representation of a service model. An outcome of SOA activities are grouped under three major categories:
1. Identification 202a.
2. Specification 202b.
3. Realization 202c.

The three categories correspond to three phases of service oriented modeling and architecture (SOMA) methodology. SOMA is an end to end SOA development method aimed at enabling target business processes through the identification, specification, realization, implementation, and deployment of business-aligned services that form a service oriented architecture (SOA) foundation.

Figure 3:
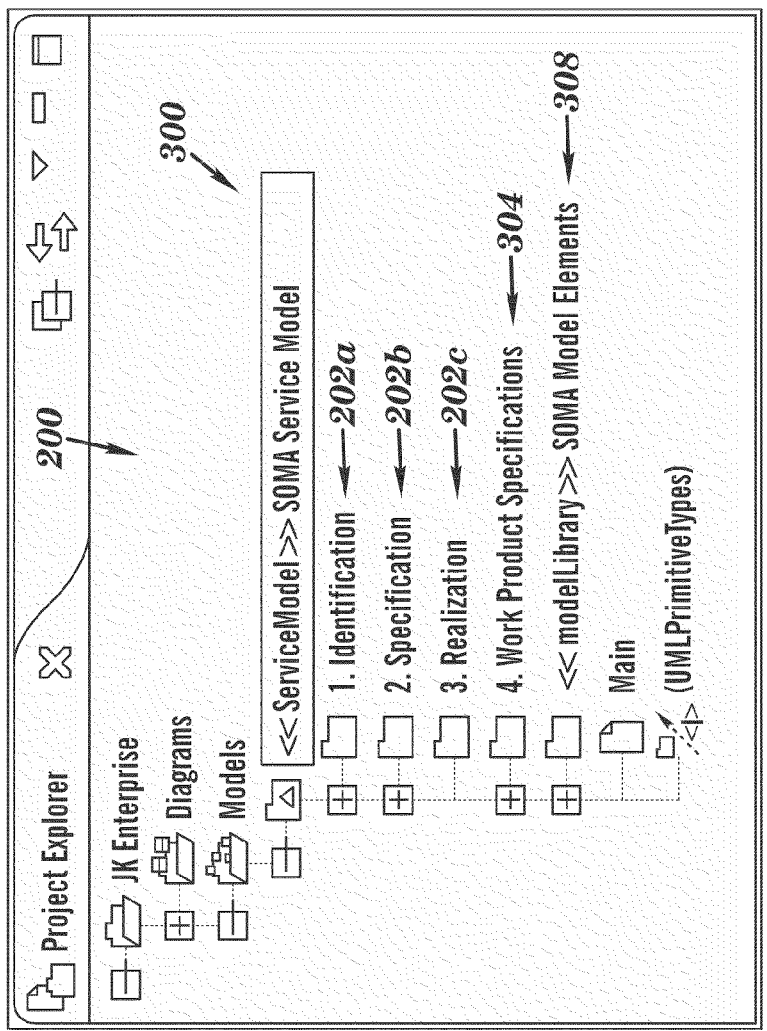
FIG. 3 illustrates a UML representation of a service model, in accordance with embodiments of the present invention.

FIG. 3 illustrates a UML representation 300 of service model 200 of FIG. 2, in accordance with embodiments of the present invention. A UML model with a service model stereotype is an outer most container. UML model 200 comprises UML packages corresponding to the three phases of SOMA methodology:
1. Identification 202a.
2. Specification 202b.
3. Realization 202c.

Work product specifications package 304 is used to annotate a dynamic content of various work products that may be generated. SOMA model elements package comprises various SOA model elements that may be used in this service model.

Figure 4:
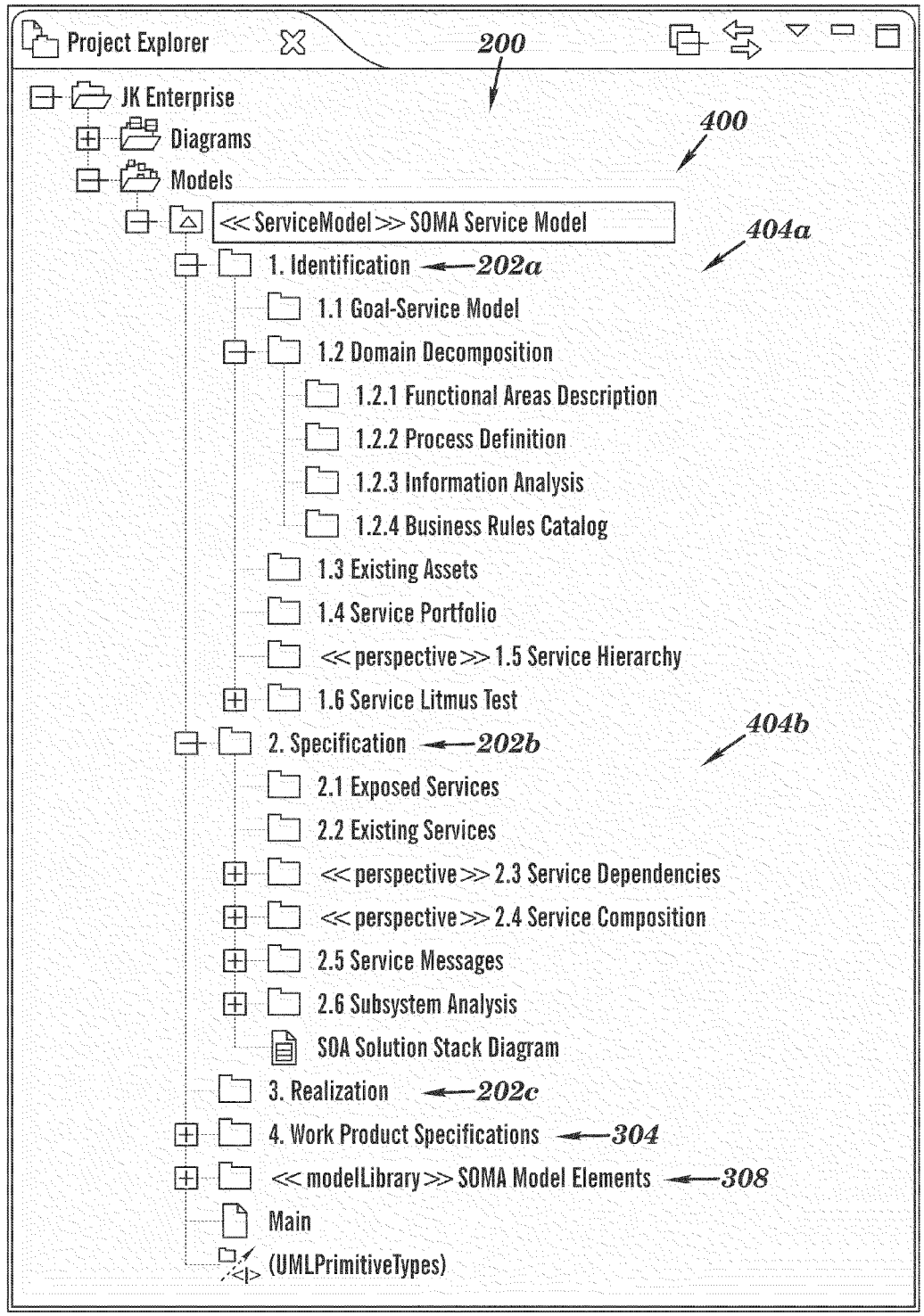
FIG. 4 illustrates a UML representation of a service model comprising sub-packages, in accordance with embodiments of the present invention.

FIG. 4 illustrates a UML representation 400 of service model 200 of FIG. 2 comprising sub-packages 404a and 404b, in accordance with embodiments of the present invention. Sub-package 404a has been expanded from UML package identification 202a. Sub-package 404b has been expanded from UML package specification 202b.

Figure 5:
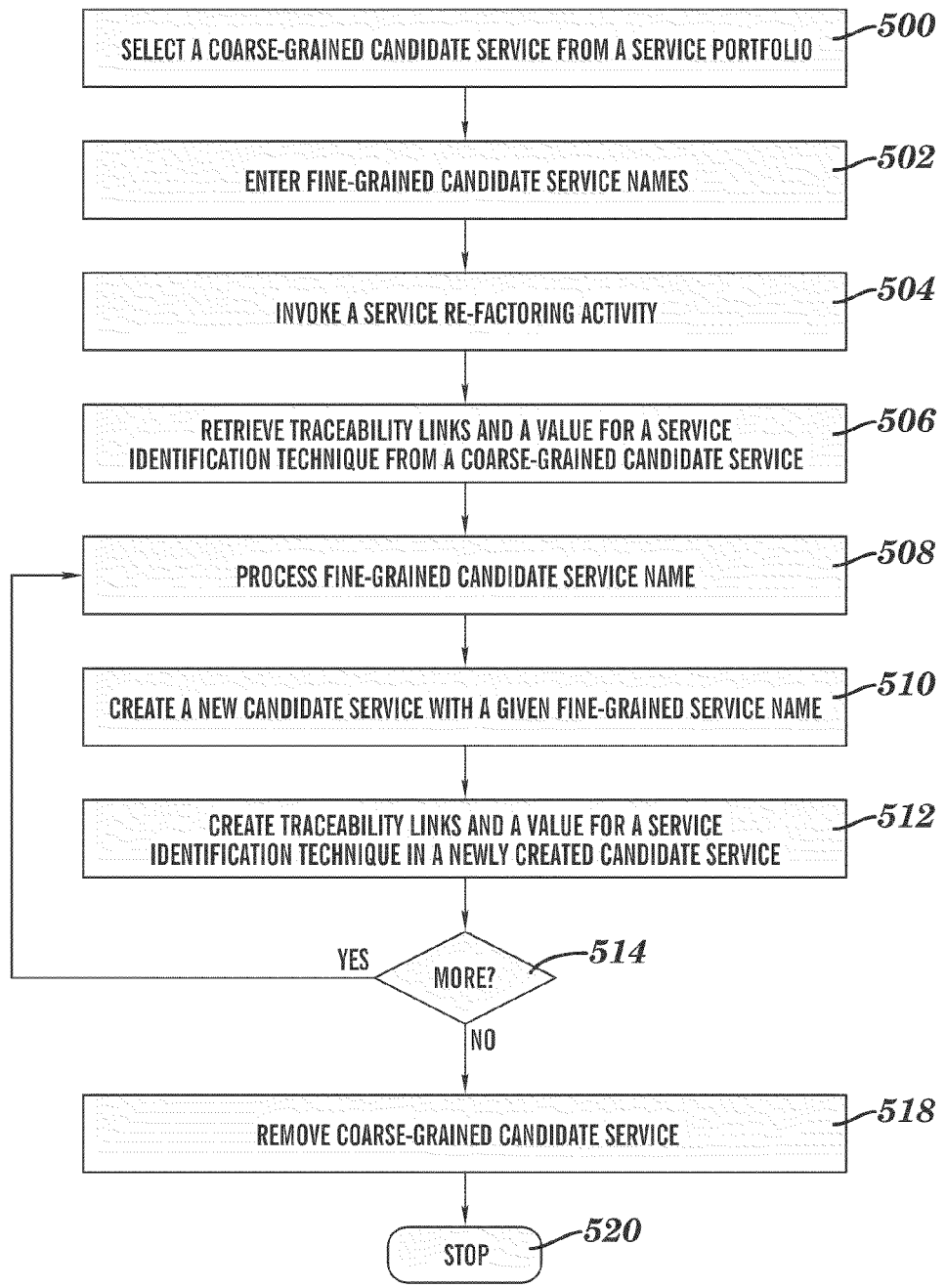
FIG. 5 illustrates a flowchart describing an algorithm used by the system of FIG. 1 for re-factoring a coarse-grained candidate service into multiple fine-grained candidate services, in accordance with embodiments of the present invention.

FIG. 5 illustrates a flowchart describing an algorithm used by system 5 of FIG. 1 for re-factoring a coarse-grained candidate service into multiple fine-grained candidate services, in accordance with embodiments of the present invention. In step 500, a coarse-grained candidate service is selected from a service portfolio. The coarse-grained candidate service is required to be re-factored. The coarse-grained candidate service may be selected from a service portfolio. User interface illustrated in FIG. 9 may be used to perform this step. In step 502, names of fine-grained candidate services to be created are entered (i.e., using the user interface illustrated in FIG. 9) into the computing system. In step 504, service re-factoring activities are invoked (i.e., executed). In step 506, traceability links are retrieved from a coarse-grained candidate service. Additionally, a value for a service identification technique is retrieved from the coarse-grained candidate service. In step 508, every fine-grained candidate service name is processed and passed to step 510. In step 510, a new fine-grained candidate service with a given name is created. In step 512, traceability links for the newly created candidate service are generated and a value for the service identification technique is assigned. In step 514, it is determined if there are additional fine-grained candidate service names that have not been processed. If in step 514, it is determined that there are additional fine-grained candidate service names that have not been processed then step 508 is repeated. If in step 514, it is determined that there are not any additional fine-grained candidate service names that have not been processed then in step 518, the coarse grained candidate service is removed from the computing system and the process is terminated in step 520.

Figure 6:
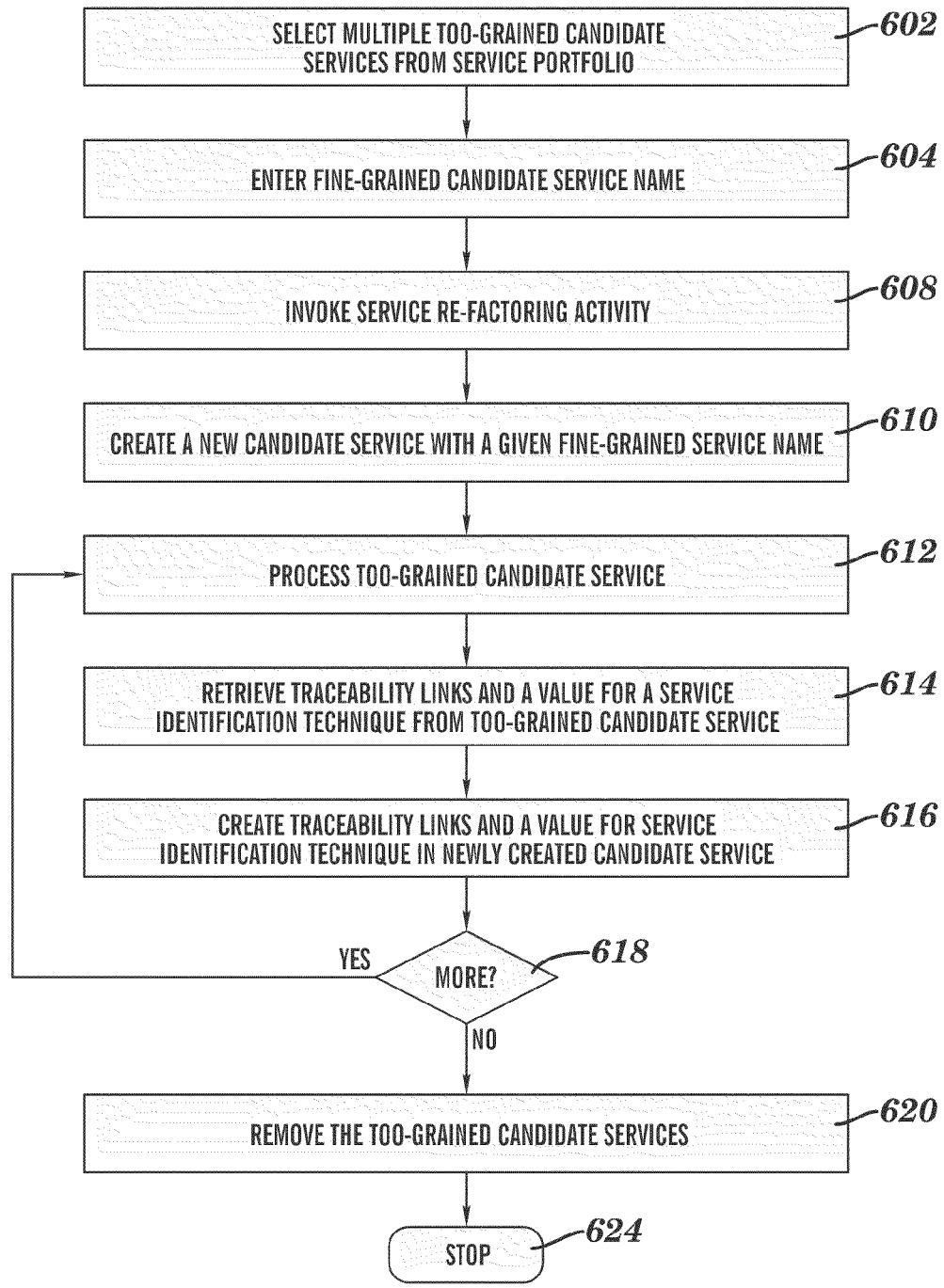
FIG. 6 illustrates a flowchart describing an algorithm used by the system of FIG. 1 for re-factoring multiple too-grained candidate services into a single fine-grained candidate service, in accordance with embodiments of the present invention.

FIG. 6 illustrates a flowchart describing an algorithm used by system 5 of FIG. 1 for re-factoring multiple too-grained candidate services into a single fine-grained candidate service, in accordance with embodiments of the present invention. In step 602, multiple too-grained candidate services are selected for refactoring. The set of too-grained candidate services are selected from a service portfolio via a user interface (e.g., as illustrated in FIG. 10). In step 604, a name for a fine-grained candidate service to be created (i.e., from the set of too-grained candidate services) is entered via a user interface (e.g., as illustrated in FIG. 10). In step 608, a user invokes service re-factoring activities via a user interface (e.g., as illustrated in FIG. 10). In step 610, a computing system (e.g., computing system 10 of FIG. 1) creates a new candidate service with the fine-grained service name selected in step 604. In step 612, the computing system processes every too-grained candidate service selected through the user interface. In step 614, traceability links and a value for a service identification technique are selected from the too-grained candidate service. In step 616, the computing system creates the traceability links and the value of the service identification technique in the newly created fine-grained candidate service. In step 618, it is determined if there are any additional too-grained candidate services that have not been processed. If in step 618, it is determined that there are additional too-grained candidate services that have not been processed then step 612 is repeated. If in step 618, it is determined that there are not any additional too-grained candidate services that have not been processed then in step 620, the computing system removes the too-grained candidate services from memory and the process is terminated in step 624.

Figure 7:
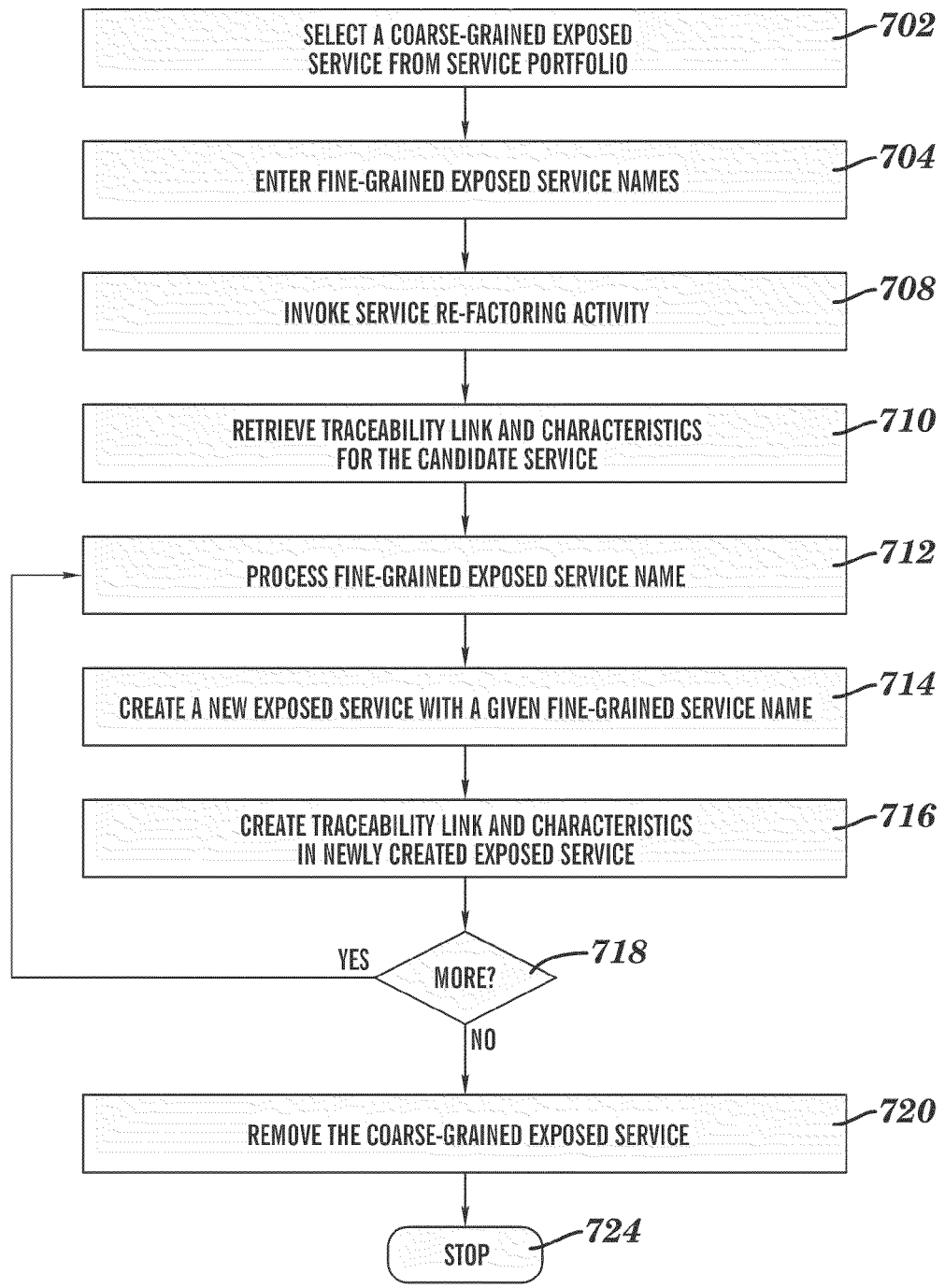
FIG. 7 illustrates a flowchart describing an algorithm used by the system of FIG. 1 for re-factoring a coarse-grained exposed service into multiple fine-grained exposed services, in accordance with embodiments of the present invention.

FIG. 7 illustrates a flowchart describing an algorithm used by system 5 of FIG. 1 for re-factoring a coarse-grained exposed service into multiple fine-grained exposed services, in accordance with embodiments of the present invention. In step 702, a coarse-grained exposed service is selected for refactoring. The coarse-grained exposed service is selected from a service portfolio via a user interface (e.g., as illustrated in FIG. 11). In step 704, names for the fine-grained exposed services to be created (i.e., from the coarse grained exposed service) is entered via a user interface (e.g., as illustrated in FIG. 11). In step 708, a user invokes service re-factoring activities via a user interface (e.g., as illustrated in FIG. 11). In step 710, a computing system (e.g., computing system 10 of FIG. 1) retrieves a traceability link and characteristics of the coarse-grained exposed service. The characteristics may include, inter alia, service operations, parameters of service operations, service messages, service dependencies, service compositions, service non-functional requirements, associated business rules, realizing service components, associated use cases of a selected coarse-grained exposed service, etc. In step 712, the computing system processes every fine-grained exposed service selected through the user interface. In step 714, the computing system creates a new exposed service with the fine-grained service name selected in step 704. In step 716, the computing system creates the traceability links and the characteristics in the newly created exposed service. In step 718, it is determined if there are any additional fine-grained exposed services that have not been processed. If in step 718, it is determined that there are additional fine-grained exposed services that have not been processed then step 712 is repeated. If in step 718, it is determined that there are not any additional fine-grained exposed services that have not been processed then in step 720, the computing system removes the course grained exposed service from memory and the process is terminated in step 724.

Figure 8:
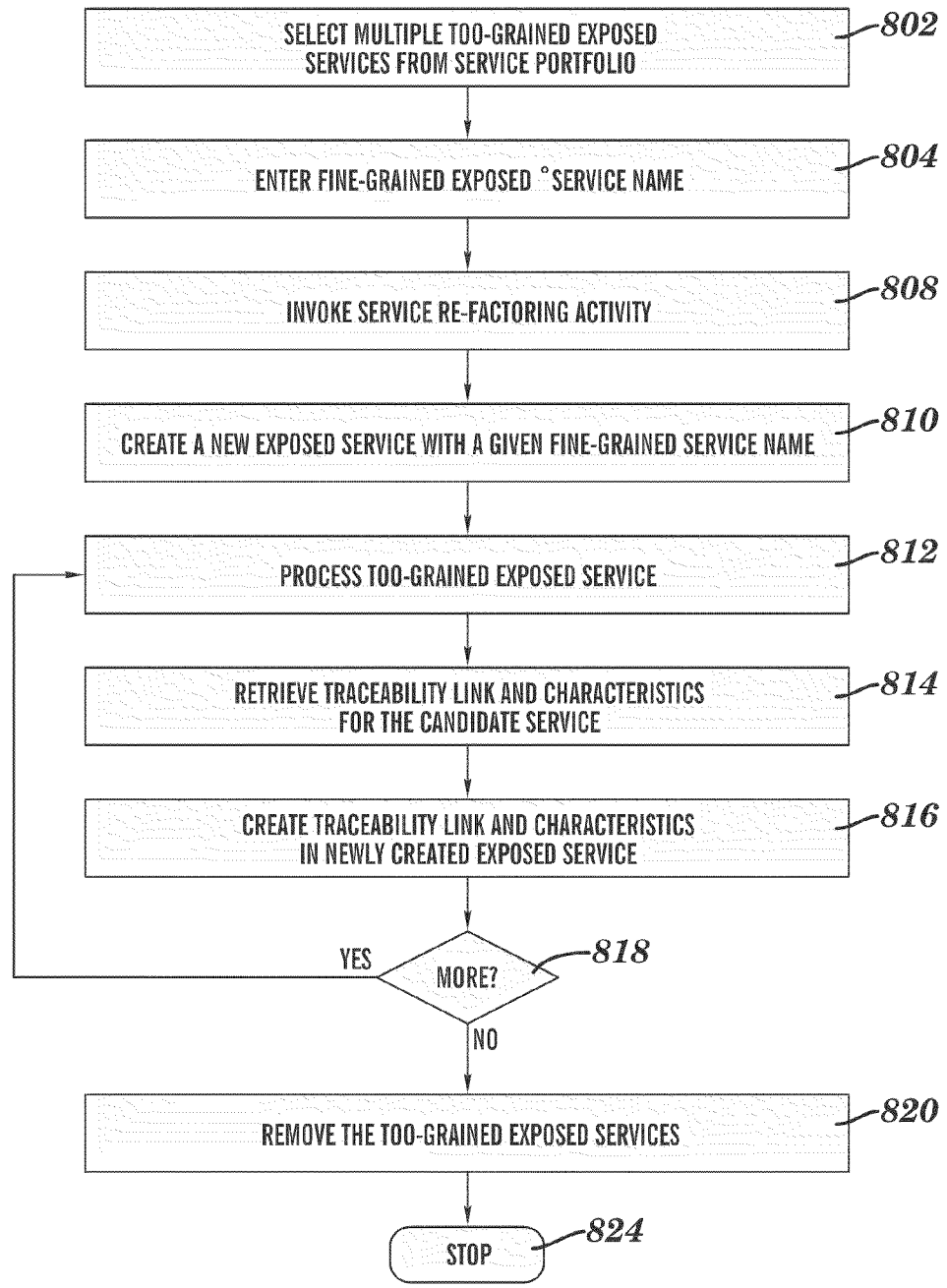
FIG. 8 illustrates a flowchart describing an algorithm used by the system of FIG. 1 for re-factoring multiple too-grained exposed services into a single fine-grained exposed service, in accordance with embodiments of the present invention.

FIG. 8 illustrates a flowchart describing an algorithm used by system 5 of FIG. 1 for re-factoring multiple too-grained exposed services into a single fine-grained exposed service, in accordance with embodiments of the present invention. In step 802, multiple too-grained exposed services are selected for refactoring. The multiple too-grained exposed services are selected from a service portfolio via a user interface (e.g., as illustrated in FIG. 12). In step 804, a name for a fine-grained exposed service to be created (i.e., from the multiple too-grained exposed services) is entered via a user interface (e.g., as illustrated in FIG. 12). In step 808, a user invokes service re-factoring activities via a user interface (e.g., as illustrated in FIG. 12). In step 810, a computing system (e.g., computing system 10 of FIG. 1) creates a new exposed service with the fine-grained service name selected in step 804. In step 812, the computing system processes every too-grained exposed service selected through the user interface. In step 814, the computing system retrieves a traceability link and characteristics of the too-grained exposed service. The characteristics may include, inter alia, service operations, parameters of service operations, service messages, service dependencies, service compositions, service non-functional requirements, associated business rules, realizing service components, associated use cases of a selected too-grained exposed service, etc. In step 816, the computing system creates the traceability links and the characteristics in the newly created exposed service. In step 818, it is determined if there are any additional too-grained exposed services that have not been processed. If in step 818, it is determined that there are additional too-grained exposed services that have not been processed then step 812 is repeated. If in step 818, it is determined that there are not any additional too-grained exposed services that have not been processed then in step 820, the computing system removes the too-grained exposed service from memory and the process is terminated in step 824.

FIG. 9 illustrates a user interface 900, in accordance with embodiments of the present invention. User interface 900 is used for re-factoring a single coarse-grained candidate service to multiple fine-grained candidate services. User interface 900 provides a facility for user to select one coarse-grained candidate service from a service portfolio (i.e., a collection of services). User interface 900 allows the user to enter names of multiple fine-grained candidate services as text.

FIG. 10 illustrates a user interface 1000, in accordance with embodiments of the present invention. User interface 1000 is used for re-factoring multiple too-grained candidate services to a single fine-grained candidate service. User interface 1000 provides a facility for a user to select multiple too-grained candidate services from a service portfolio. User interface 1000 allows the user to enter the name of a fine-grained candidate service as text.

FIG. 11 illustrates a user interface 1100, in accordance with embodiments of the present invention. User interface 1100 is used to re-factor a single coarse-grained exposed service to multiple fine-grained exposed services. User interface 1100 provides a facility for a user to select one coarse-grained exposed service from service a portfolio. User interface 1100 allows the user to enter names of multiple fine-grained exposed services as text.

FIG. 12 illustrates a user interface 1200, in accordance with embodiments of the present invention. User interface 1200 is used to re-factor multiple too-grained exposed services to a single fine-grained exposed service. User interface 1200 provides a facility for a user to select multiple too-grained exposed services from a service portfolio. User interface 1200 allows the user to enter the name of a fine-grained exposed service as text.

Figure 13:
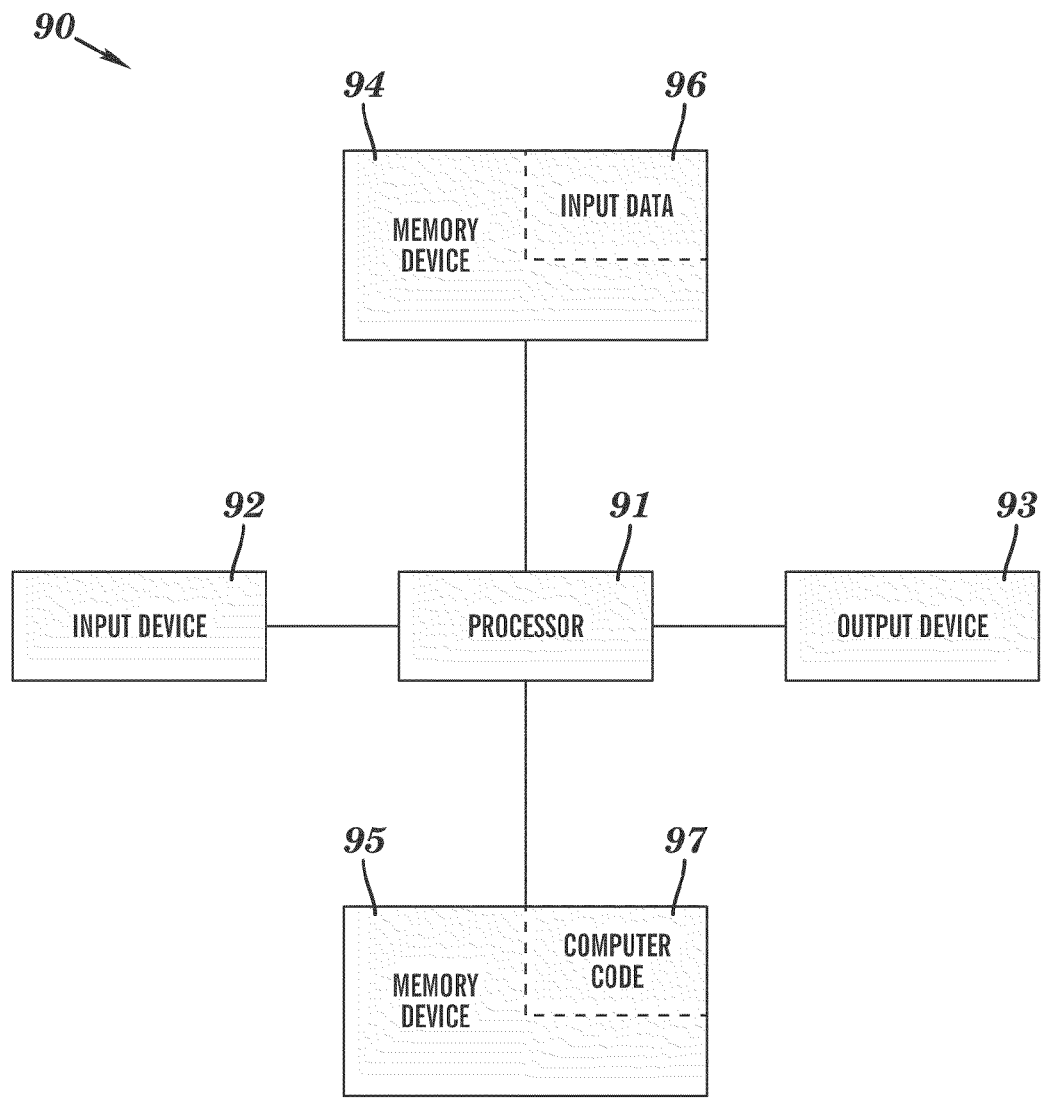
FIG. 13 illustrates a computer apparatus used for re-factoring services in an SOA project, in accordance with embodiments of the present invention.

FIG. 13 illustrates a computer apparatus 90 (e.g., computing system 10 of FIG. 1) used for re-factoring services in an SOA project, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-8) for re-factoring services in an SOA project. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may comprise the algorithms of FIGS. 5-8 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for re-factor services in an SOA project. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for re-factoring services in an SOA project. In another embodiment, the invention provides a business method that performs the process steps of the invention on a subscription, advertising, and/or fee basis. That is, a service provider, such as a Solution Integrator, could offer to re-factor services in an SOA project. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   selecting, by a computing system from a service portfolio associated with a service oriented architecture (SOA) project in response to a command from a user, a first service comprising a first name for said first service;
   receiving, by said computing system from said user, a second name for a second service to be generated from said first service;
   executing, by said computing system, a service refactoring software application;
   adjusting, by said computing system in response to said executing, a granularity of said first service;
   generating, by said computing system as a result of said adjusting, said second service;
   associating, by said computing system, said second service with said second name;
   retrieving, by said computing system, first traceability links associated with said first service;
   retrieving, by said computing system, a first value associated with a first service identification technique associated with identifying said first service;
   creating, by said computing system, said first traceability links within said second service;
   generating, by said computing system, a second value associated with a second service identification technique associated with identifying said second service;
   removing, by said computing system, said first service, said first name, and said first value; and
   storing, by said computing system, said second service, said second name, said second value, and said first traceability link.

2. The method of claim 1, wherein said first service comprises a coarse-grained candidate service, wherein said second service comprises fine-grained candidate services, wherein said generating said second service comprises re-factoring said coarse-grained candidate service into said fine-grained candidate services, and wherein said method further comprises:
   processing, by said computing system, said second name.

3. The method of claim 1, wherein said first service comprises too-grained candidate services, wherein said second service comprises a fine-grained candidate service, wherein said generating said second service comprises re-factoring said too-grained candidate services into said fine- grained candidate service, and wherein said method further comprises:
   processing, by said computing system, said second name.

4. The method of claim 1, wherein said first service comprises a coarse-grained exposed service, wherein said second service comprises fine-grained exposed services, wherein said generating said second service comprises re-factoring said coarse-grained exposed service into said fine- grained exposed services, and wherein said method further comprises:
   processing, by said computing system, said second name.

5. The method of claim 4, further comprising:
   retrieving, by said computing system, characteristics associated with said first service, wherein said characteristics are selected from the group consisting of service operations, parameters of service operations, service messages, service dependencies, service compositions, service non-functional requirements, associated business rules, realizing service components, and associated use cases of said first service; and
   creating, by said computing system, said characteristics within said second service.

6. The method of claim 1, wherein said first service comprises too-grained exposed services, wherein said second service comprises fine-grained exposed service, wherein said generating said second service comprises re-factoring said too-grained exposed services into said fine- grained exposed service, and wherein said method further comprises:
   processing, by said computing system, said second name.

7. The method of claim 6, further comprising:
   retrieving, by said computing system, characteristics associated with said first service, wherein said characteristics are selected from the group consisting of service operations, parameters of service operations, service messages, service dependencies, service compositions, service non-functional requirements, associated business rules, realizing service components, and associated use cases of said first service; and
   creating, by said computing system, said characteristics within said second service.

8. The method of claim 1, further comprising:
   storing, by said computing system, said second service, said second name, said second value, and said second traceability link in said SOA project; and
   executing, by said computing system, said SOA project.

9. The method of claim 1, wherein said service portfolio is retrieved from said SOA project.

10. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

11. A computer program product, comprising a computer memory device storing a computer readable program code, said computer readable program code configured to perform the method of claim 1 upon being executed by a processor of said computing system.

12. A computing system comprising a processor coupled to a computer-readable memory unit, said memory unit comprising instructions that when executed by the processor implements a service re-factoring method, said method comprising:
   selecting, by said computing system from a service portfolio associated with a service oriented architecture (SOA) project in response to a command from a user, a first service comprising a first name for said first service;
   receiving, by said computing system from said user, a second name for a second service to be generated from said first service;
   executing, by said computing system, a service refactoring software application;
   adjusting, by said computing system in response to said executing, a granularity of said first service;
   generating, by said computing system as a result of said adjusting, said second service;

associating, by said computing system, said second service with said second name;

retrieving, by said computing system, first traceability links associated with said first service;

retrieving, by said computing system, a first value associated with a first service identification technique associated with identifying said first service;

creating, by said computing system, said first traceability links within said second service;

generating, by said computing system, a second value associated with a second service identification technique associated with identifying said second service;

removing, by said computing system, said first service, said first name, and said first value; and storing, by said computing system, said second service, said second name, said second value, and said first traceability link.

13. The computing system of claim 12, wherein said first service comprises a coarse-grained candidate service, wherein said second service comprises fine-grained candidate services, wherein said generating said second service comprises re-factoring said coarse-grained candidate service into said fine-grained candidate services, and wherein said method further comprises:

processing, by said computing system, said second name.

14. The computing system of claim 12, wherein said first service comprises too-grained candidate services, wherein said second service comprises a fine-grained candidate service, wherein said generating said second service comprises re-factoring said too-grained candidate services into said fine-grained candidate service, and wherein said method further comprises:

processing, by said computing system, said second name.

15. The computing system of claim 12, wherein said first service comprises a coarse-grained exposed service, wherein said second service comprises fine-grained exposed services, wherein said generating said second service comprises re-factoring said coarse-grained exposed service into said fine-grained exposed services, and wherein said method further comprises:

processing, by said computing system, said second name.

16. The computing system of claim 15, wherein said method further comprises:

retrieving, by said computing system, characteristics associated with said first service, wherein said characteristics are selected from the group consisting of service operations, parameters of service operations, service messages, service dependencies, service compositions, service non-functional requirements, associated business rules, realizing service components, and associated use cases of said first service; and creating, by said computing system, said characteristics within said second service.

17. The computing system of claim 12, wherein said first service comprises too-grained exposed services, wherein said second service comprises fine-grained exposed service, wherein said generating said second service comprises re-factoring said too-grained exposed services into said fine-grained exposed service, and wherein said method further comprises:

processing, by said computing system, said second name.

18. The computing system of claim 17, wherein said method further comprises:

retrieving, by said computing system, characteristics associated with said first service, wherein said characteristics are selected from the group consisting of service operations, parameters of service operations, service messages, service dependencies, service compositions, service non-functional requirements, associated business rules, realizing service components, and associated use cases of said first service; and creating, by said computing system, said characteristics within said second service.

19. The computing system of claim 12, wherein said method further comprises:

storing, by said computing system, said second service, said second name, said second value, and said second traceability link in said SOA project; and executing, by said computing system, said SOA project.

20. The computing system of claim 12, wherein said service portfolio is retrieved from said SOA project.

* * * * *